3,112,616
THRUST VECTORING AND MODULATING DEVICE

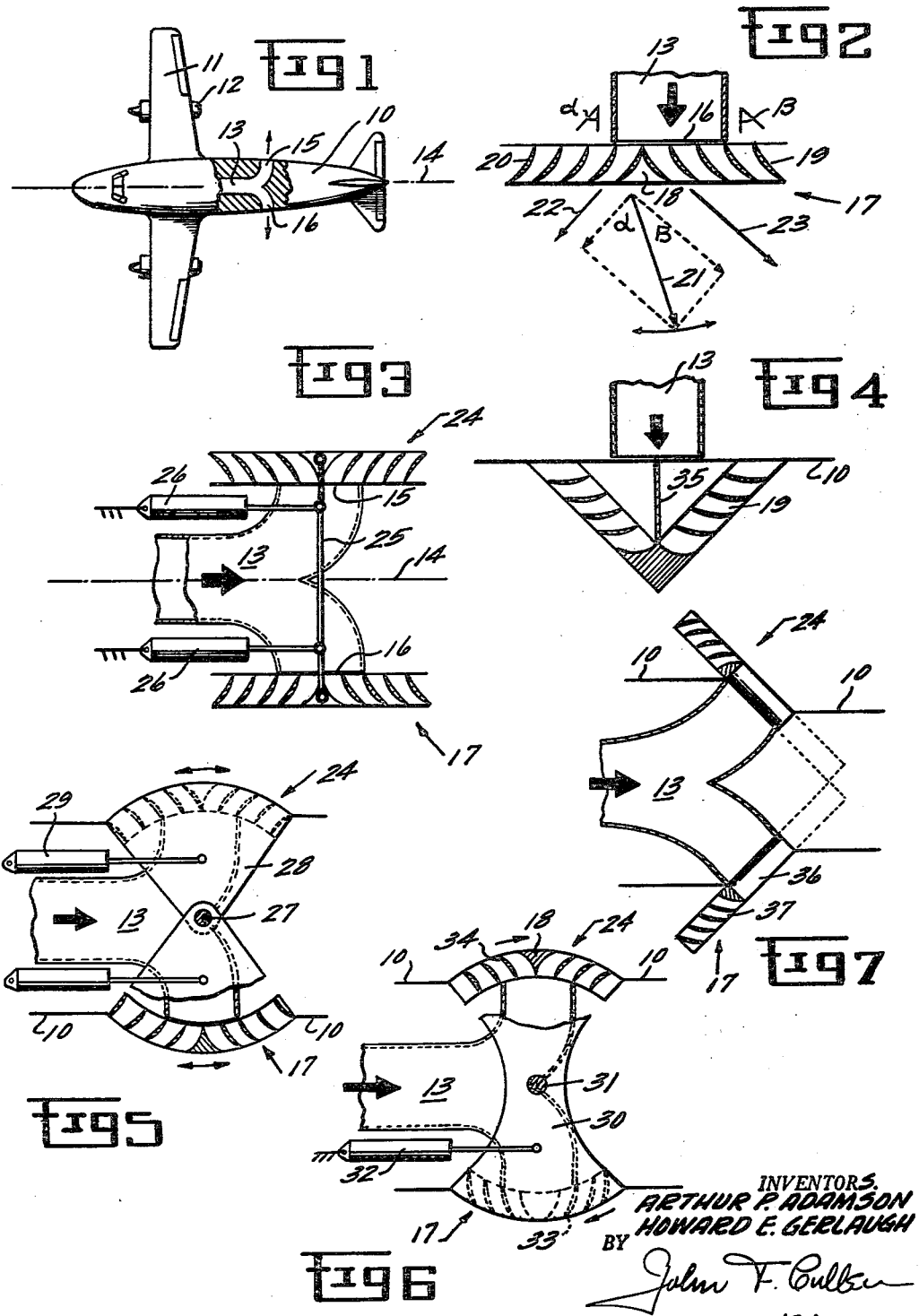

Arthur P. Adamson, Cincinnati, Ohio, and Howard Edmonds Gerlaugh, Ormond Beach, Fla., assignors to General Electric Company, a corporation of New York
Filed Oct. 18, 1962, Ser. No. 231,352
11 Claims. (Cl. 60—35.54)

The present invention relates to a thrust vectoring and modulating apparatus and, more particularly, to an apparatus that may be applied to an aircraft to change the direction and magnitude of propelling exhaust gases issuing from the aircraft.

With the advent of lightweight high thrust jet engines for aircraft use, many applications for many sizes of such powerplants have been proposed. Typical applications may use small gas generating powerplants, or jet engines, as auxiliary equipment or assist equipment on propeller driven aircraft or on jet driven aircraft. There are many applications for STOL—Short Take-Off and Landing—aircraft whether jet driven or propeller driven. In such applications, it is necessary to get the aircraft off the ground in a short distance and, upon landing, stop it in a short distance. In both conditions, the conventional powerplant, whether propeller or jet, may be insufficient by itself to provide the necessary large take-off thrust and the reverse thrust on landing. For this purpose, an auxiliary powerplant of the gas generator or jet engine type may be used on only a short portion of the mission with the result that its high fuel consumption is not objectionable.

The use of an auxiliary powerplant for these purposes must not introduce unbalancing loads to the aircraft thus creating control problems. Additionally, it must respond quickly as well as have a wide range of operation.

The main object of the present invention is to provide a thrust vectoring and modulating apparatus that maintains balanced forces on the aircraft at all times during use.

A further object is to provide such an apparatus that may be used as an auxiliary device for additional take-off thrust and reverse thrust and vector the discharge and modulate it over a wide range.

Another object of the invention is to provide such an apparatus that may be used in a fuselage or nacelle, or any aircraft member where an engine might be used, and may be warmed up before use without having any thrusting effect on the aircraft.

Still another object is to provide such an apparatus which may take several forms of execution, each form having various advantages.

Briefly stated, the invention provides a thrust vectoring and modulating apparatus for use in an aircraft which has a gas generator, such as a jet engine, to provide exhaust gases. A duct is connected to the gas generator and preferably has plural outlets that are spaced from the longitudinal centerline of the duct so as to discharge on each side of the fuselage or nacelle as the case may be. Over each outlet a cascade of louvers is provided and these louvers are movable by translation or rotation across the outlet. Each cascade is divided into sections of differently directed louvers and means is provided to move the cascades, the whole arrangement providing balanced forces on the aircraft at all times.

While the specification concludes with claims particularly pointing out and distinctly claiming the subject matter which is regarded as the invention, it is believed the invention will be better understood from the following description taken in connection with the accompanying drawing in which:

FIGURE 1 is a plan view of a typical aircraft showing the general application of the invention;

FIGURE 2 is a partial sectional view of a duct and louver illustrating the principle of the invention;

FIGURE 3 is a partial sectional view of a duct and translatable cascade arrangement;

FIGURE 4 is a view similar to FIGURE 3 showing a cascade as it might be applied in different planes to a duct outlet;

FIGURE 5 is a partial view of a ducted cascade arrangement employing rotatable cascades and single pivot arrangement;

FIGURE 6 is a view similar to FIGURE 5 showing a rotatable cascade and different pivot arrangement, the cascades being differently directed and, FIGURE 7 is a partial sectional view of another form of translatable cascade which might be used to provide vertical lift or horizontal thrust.

Referring first to FIGURE 1, there is shown an aircraft having a fuselage 10, conventional wings 11, and powerplant propelling means 12 all in the conventional manner. It is to be understood that powerplant 12 may represent a nacelle in either a propeller engine or a jet engine. For purposes of description only, it will be assumed that the instant invention is intended as an auxiliary to an aircraft and is applicable to either the fuselage 10 or powerplant nacelle 12 or any other suitable aircraft member as will be apparent. Further, it is assumed that the aircraft of FIGURE 1 must have additional power for take-off and is not sufficiently equipped for the amount of reverse thrust required upon landing. A suitable gas generator, whether it be separate or part of a reaction powerplant, is provided in the aircraft as a source of the auxiliary power required. To convey exhaust gases to a point of use, there is provided a duct 13 longitudinally disposed with a centerline 14 through the fuselage.

In order to effectively utilize this auxiliary power provided by the exhaust gases, the duct is preferably divided into a Y-shaped to provide plural outlets 15 and 16 and any additional as well as a single outlet as may be preferred. The plural outlet arrangement is shown symmetrically disposed about the duct centerline and in the fuselage as the most convenient execution but again, depending on the location of the engine, can be carried in a pod or a nacelle such as shown in powerplant nacelle 12.

Referring next to FIGURE 2, the concept of the instant invention will be explained. This figure represents one side of the plural outlet duct 13, it being understood that the other side is identical. Each outlet 16 is spaced from the centerline 14 and is provided with a cascade of louvers, generally indicated at 17, that is movable over the outlet. The cascade may be suitably carried by a track structure not shown. Each cascade over each outlet includes at least two sections of differently directed louvers for a purpose to be explained. These sections, which may be thought of as the section to the right of dividing piece 18 and that to the left of dividing piece 18, are directed at angles beta and alpha, respectively. If FIGURE 2 is thought of as the section lifted out of FIGURE 1, it can be seen that section 19 will direct exhaust gases from duct 13 rearwardly and section 20 will direct the gases forwardly.

In order to change the direction and magnitude of the exhaust gases, cascade 20, as shown in FIGURE 2, is movable by translation to the left across outlet 16. This will result in more louvers in section 19 intercepting the exhaust gases and fewer louvers in section 20 intercepting exhaust gases as shown in FIGURE 2. The result, as shown by the force diagram in FIGURE 2, is a resultant force shown by arrow 21 directed slightly to the rear. This force 21 is the resultant of forward force 22 and rearward force 23 as will be apparent. It will also be apparent that movement of the cascade across the outlet will vary not only the direction but the magnitude of resultant force 21. In other words, as the cascade is moved to the right, forward force 22 becomes larger and rearward force 23 smaller creating a resultant forward force. It can be seen that this resultant force may move from complete thrust reversal when dividing piece 18 is at the right end of the duct to complete forward thrust when it is at the left end of the duct. Furthermore, the resultant force varies infinitely in a smooth range between these two extremes, not only in direction but also in magnitude, as more or fewer of the individual louvers in the sections 19 and 20 are brought into line with outlet 16.

It is important to note that a duplicate cascade arrangement 24 is provided on the opposite outlet 15 as may be seen by reference to FIGURE 3. As a result, the force 21 has an equal mirror counterpart on the opposite side of the aircraft member resulting in balanced forces on the aircraft. In other words, as far as yaw is concerned, the forces cancel one another while still performing their reverse thrust or forward thrust function. FIGURE 3 illustrates this application and, for operation, any suitable linkage 25 may be connected to the individual cascades and operated by suitable actuators 26.

It is important that duct flow area be considered. The engine should be presented with a given flow area in order to have the right gas velocity through the engine and the right back pressure on the turbine to prevent overheating or underheating. Too much area results in fall-off of the power developed by the engine. Conversely, too little area results in too much back pressure and overheating of the engine. It can be seen that the instant arrangement permits the best constant area arrangement for the engine. As the cascade is moved across the outlet, having been designed to provide the correct area for the particular engine, as much area as is subtracted from one section is immediately added by the other section so that the engine sees a constant area outlet while the magnitude and direction of the thrust is being changed. Consequently, the engine can be designed to operate at its maximum efficiency. Alternately, excess flow area can readily be provided in the mid position region of the cascade to unload the engine if desired in this cancelling portion of the operating range.

While the cascades have been discussed as movable by translation, it will be apparent that they can be modified to operate by rotation. FIGURES 5 and 6 illustrate two rotation schemes. In FIGURE 5, the cascades may be rotated about a single central pivot 27 and each cascade operated by its own segment 28 carried by pivot 27. The segments are actuated simultaneously by suitable actuators 29 and, in this modification, the side loads due to the exhaust gases, are thus applied as pivot 27. The individual sections of the cascades are exactly as described for 19 and 20 in FIGURE 2.

In order to operate the device with a single actuator, the modification shown in FIGURE 6 may be employed. This modification does not require a separate actuator connected to each cascade. The cascades 17 and 24 are formed at the opposite ends of an integral member 30 which is pivoted at 31. With this structure a single actuator 32 may be employed. However, in such a modification it can be seen that the individual sections of each cascade must be reversed. In other words, since a single integral member is used to carry the cascades, the lower right section 33 is oriented in the same direction as the upper left section 34 and the alternate sections are similarly directed. Thus, the resultant forces are equal and opposite balancing the integral member. For example, the force on the lower right segment tends to rotate the integral member counterclockwise and that on the upper left segment rotates it clockwise so that the single actuator 32 may control both segments. A slight adjustment must be made around dividing piece 18 because of the change in direction of the louvers. In both cases the rotation of the cascades on each side is simultaneous by the actuation means.

As thus far described, it will be apparent that the rotatable thrust vectoring and modulating modifications may, by suitable design, turn the exhaust gas through a range of 180° from full forward to full reverse. It will be apparent that the translatable arrangement described in FIGURE 2 and FIGURE 3 cannot achieve this since the louvers cannot direct the gases completely to the rear or completely forwardly when the sections of each cascade lie in the same plane. To rectify this, the cascades may be moved into different planes as shown in FIGURE 4. This illustrates a V-shaped arrangement of the cascades wherein they lie in different planes and are provided with a center dividing piece 35. With this arrangement, it can be seen that the exhaust gases can be directed straight to the rear or straight forwardly. Additionally, it is possible with this arrangement to actually provide for an increase in area through the cascades over that of the duct outlet if desired. This may be desired where the engine is to be used also on cruise so that the full designed area is brought into position in the extreme left position of FIGURE 4 where the thrust is vectored straight to the rear. In other words, in that position, the area of section 19 may be exactly that called for by the engine which is the duct area. At other positions, with this arrangement, it may be greater.

In some cases it may be desirable to use the vectoring and modulating apparatus for lift instead of reverse thrust. This is easily obtained by the arrangement shown in FIGURE 7. In this figure, one of the sections 36 is turned at 90° to the other section of louver 37 which is the cruise louver section. It is noted that the section 37 is out in the air when 36 is over the duct outlet but since this occurs during the lifting portion of the flight, it is not objectionable. During cruise operation cascade 17 is translated inward to the dotted line or stowed position at which time the lift section 36 is out of operation and the cruise louver section 37 is operating directly rearwardly. Of course, suitable pitch control may be provided by other means if necessary when the aircraft is in a lifting operation using section 36. Such pitch means might even include a section 36 directed upwardly rather than down since there is no limit to the directions in which the louvers may be installed.

It will be apparent that the use of separate cascades provides complete freedom with regard to the angles and magnitude of thrust that may be obtained with the cascades operating oppositely to one another and without upsetting the balance of the aircraft. It is possible to go from complete reverse thrust to complete forward thrust and, in an auxiliary capacity, during warm-up prior to use, it is possible to provide the resultant force at 90° or out the side of the aircraft by placing the cascades in the central position, in which case the cascades have no effect on the aircraft but are ready for instant use. The double system, in effect, turns off one vector and turns on another vector from forward to rear or vice versa without any intermediate unbalancing positions.

While there have hereinbefore been described preferred forms of the invention, obviously many modifications and variations of the present invention are possible in the light of the above teachings. It is therefore to be understood that within the scope of the appended claims, the invention may be practiced otherwise than as specifically described.

We claim:

1. A thrust vectoring and modulating apparatus for an aircraft having a gas generator comprising,
   a duct connected to the gas generator for carrying exhaust gases to produce thrust,
   said duct having plural outlets spaced from the duct longitudinal centerline,
   a cascade of louvers movable over each outlet, each cascade including at least two sections of differently directed louvers, and means connected to said cascades for simultaneous movement thereof to maintain balanced lateral forces on the aircraft.

2. Apparatus as described in claim 1 wherein the cascades are translated across the outlets.

3. Apparatus as described in claim 1 wherein the cascades are rotated across the outlets.

4. Apparatus as described in claim 1 wherein the louver sections of each cascade lie in different planes.

5. A thrust vectoring and modulating apparatus for an aircraft having a gas generator comprising, a duct in an aircraft member and connected to the gas generator for carrying exhaust gas to produce thrust, said duct having a Y-shaped outlet to define a pair of outlets symmetrically disposed about duct longitudinal centerline, a cascade of louvers rotatable over each outlet about a pivot on said centerline, each cascade including two sections of differently directed louvers, and means connected to said cascades for simultaneous rotation thereof to maintain balanced forces on the aircraft.

6. Apparatus as described in claim 5 wherein each cascade is separately pivoted on said centerline and said rotation means includes a separate actuator connected to each cascade.

7. Apparatus as described in claim 5 wherein each cascade is formed at the opposite ends of an integral pivoted member and said rotation means is a single actuator connected to said member.

8. Apparatus as described in claim 5 wherein said aircraft member is the fuselage and said outlets are on each side of the fuselage.

9. A thrust vectoring and modulating apparatus for an aircraft having a gas generator comprising, a duct in an aircraft member and connected to the gas generator for carrying exhaust gases to produce thrust, said duct having a Y-shaped outlet to define a pair of outlets symmetrically disposed about the duct longitudinal centerline, a cascade of louvers translatable over each outlet, each cascade including two sections of differently directed louvers, and actuating means connected to said cascades for simultaneous translation thereof to cause balanced lateral forces on the aircraft.

10. Apparatus as described in claim 9 wherein the louver sections of each cascade are in the same plane.

11. Apparatus as described in claim 9 wherein the louver sections of each cascade are in different planes.

References Cited in the file of this patent

UNITED STATES PATENTS

| | | |
|---|---|---|
| 2,964,905 | Hewson et al. | Dec. 20, 1960 |
| 3,002,343 | Baird | Oct. 3, 1961 |
| 3,018,983 | Davidson | Jan. 30, 1962 |

FOREIGN PATENTS

| | | |
|---|---|---|
| 861,480 | Great Britain | Feb. 22, 1961 |